Sept. 5, 1944.    R. J. MILLER    2,357,485
FLUID COUPLING
Filed April 25, 1941
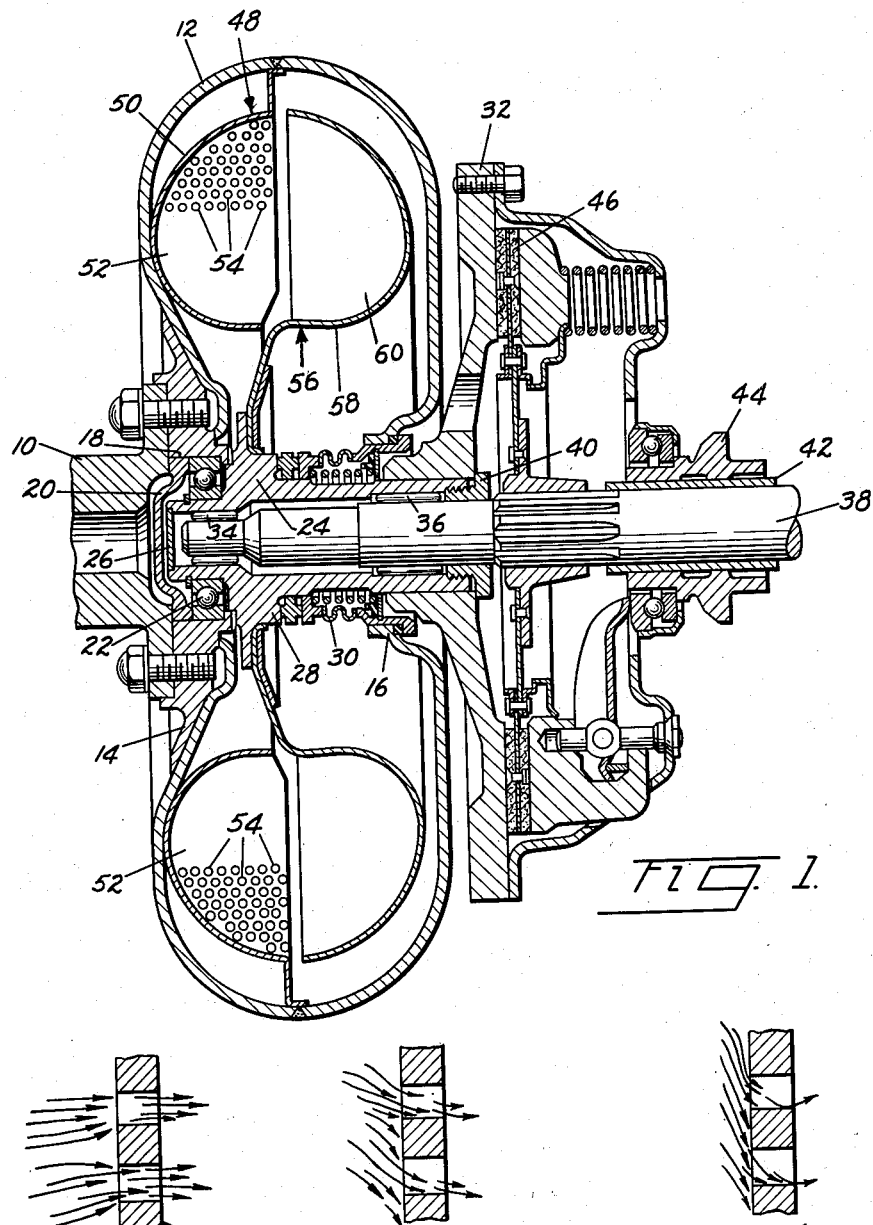
INVENTOR.
RAYMOND J. MILLER
BY
ATTORNEY Patented Sept. 5, 1944

2,357,485

UNITED STATES PATENT OFFICE 2,357,485

FLUID COUPLING

Raymond J. Miller, Detroit, Mich., assignor to Hydraulic Brake Company, Detroit, Mich., a corporation of California Application April 25, 1941, Serial No. 390,393

8 Claims. (Cl. 60—54)

This invention relates to fluid couplings.

The invention comprehends a fluid coupling including an impeller and a runner associated with one another, and means incorporated in the impeller for inhibiting drag when the runner is at rest, and the impeller is in motion.

An object of the invention is to provide a fluid coupling including a perforated impeller and a runner providing in conjunction with one another a fluid circuit, the perforations serving to by-pass the fluid in the circuit at a rate decreasing proportionately to increase in speed of rotation of the impeller.

Another object of the invention is to provide a fluid coupling including an impeller and a runner providing in conjunction therewith a fluid circuit, the impeller having means for control of the circuit automatically under the influence of the speed of rotation of the impeller and the velocity of the fluid in the circuit.

Another object of the invention is to provide a fluid coupling including an impeller and a runner providing in conjunction with one another a fluid circuit, and means incorporated in the impeller for automatically controlling the circuit governed by the speed of rotation of the impeller and the velocity of the fluid in the unit.

Other objects and advantages of the invention will appear from the following description taken in connection with the drawing forming a part of this specification, and in which—

Fig. 1 is a vertical sectional view of a fluid coupling embodying the invention;

Figs. 2, 3, and 4 are diagrammatical views illustrating the flow of fluid at different speeds of rotation of the unit.

Referring to the drawing, 10 represents a driving shaft supporting a housing 12. The housing includes a case having a concentrically disposed hub 14 suitably secured to the driving shaft, and a hub 16 oppositely disposed with relation to the hub 14. As shown, the hub 14 has an axial bore 18, and fitted in this bore is a closure plate 20 and also a bearing 22.

A sleeve 24 supported for rotation on the bearing 22 in axial alignment with the driving shaft 10 extends through the hub 16. The sleeve 24 has one of its ends closed as by a plug 26, and arranged on the sleeve adjacent this end is a circumferential flange 28. A fluid seal 30 is interposed between the flange 28 and the hub 16, and a clutch member 32 is splined on the outer end of the sleeve.

Pin bearings 34 and 36 arranged in the sleeve 24 in spaced relation to one another support for rotation a driven shaft 38, and a retaining ring 40 sleeved on the shaft and threaded in the sleeve serves to retain the clutch member 32 against displacement. The driven shaft extends through a sleeve 42 on a transmission housing 44 and is supported on a suitable bearing, not shown, and splined on the driven shaft for rotation therewith and for relative axial movement is a clutch member 46 for cooperation with the clutch member 32.

An impeller indicated generally at 48 includes a shroud 50 suitably secured to the inner wall of the housing, and arranged on this shroud are spaced blades 52 preferably perforated as indicated at 54, and, correspondingly, a runner indicated generally at 56 includes a shroud 58 supported on the flange 28, and arranged on this shroud are spaced blades 60.

The structure hereinabove described is more or less conventional. In fluid couplings of this and all other types, there is slip between the driving and driven members, resulting in a differential in speed between the members, and this is highly desirable in certain stages of an efficient fluid coupling. However, rotation of the driving member imposes a drag on the driven member. When the driving member is rotating at low speed and the driven member is coming to a stop, there is an undesirable drag. The maximum undesirable drag occurs at this period of the operation, resulting in creep of the driven member. This is highly objectionable, and it is the aim of the instant invention to overcome such objection.

In the instant invention the blades of the impeller are perforated as indicated at 54. The perforations are arranged on the peripheral ends of the blades in spaced, staggered relation to one another and the individual perforations are preferably very small in area.

In a normal operation, assuming that the housing 12 is filled with a suitable fluid to a predetermined degree of its capacity, upon initial rotation of the housing by force received from the driving shaft 10, the fluid in the housing is energized by the impeller 48 and by centrifugal force resulting from rotation of the coupling. These forces cause movement of the fluid in the circuit.

Initially the fluid impinges on the blades of the impeller at an angle approximately normal to the blades, and because of the low velocity of the fluid at this stage of the operation a greater portion of the fluid by-passes the blades through the perforations therein, as is most clearly illustrated in Fig. 2, and only a small quantity of the fluid is energized by the impeller. This results in high slip.

This small quantity of energized fluid entering the runner 56 is insufficient to cause rotation of the runner, hence at low speeds of rotation of the coupling, such as when idling, the runner remains static and accordingly there is no creep. However, as the speed of the impeller increases the angle of approach of the fluid to the impeller blades changes to a decided oblique angle as illustrated in Fig. 3, and concomitantly with this change the velocity of the fluid increases. Under these conditions the perforations effectively restrict the movement of the fluid through the blades so that a considerably less quantity of fluid is by-passed, and accordingly a larger volume of fluid is energized by the impeller, and when this large volume of energized fluid enters the runner rotation thereof is attained. At this stage the slip is relatively high.

As the speed of rotation of the impeller increases, the approach of the fluid to the impeller blades changes to an angle substantially perpendicular to the walls defining the perforations as illustrated in Fig. 4, and the velocity of the fluid further increases. This results in further restricting the movement of fluid through the perforations to such an extent that substantially no fluid by-passes the blades, hence a large volume of fluid is energized by the impeller and transmitted to the runner. At high speeds the blades have substantially the same characteristics as solid blades.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid coupling comprising an impeller, a runner cooperating with the impeller and providing in conjunction therewith a fluid circuit, and means for by-passing fluid in the circuit through the working faces of the blades of the impeller at a rate decreasing in proportion to increase in speed of the impeller.

2. A fluid coupling comprising an impeller and a runner providing in conjunction with one another a fluid circuit, and means for by-passing large volumes of fluid in the circuit through the working faces of the blades of the impeller when rotating at low speeds and relatively small volumes when rotating at higher speeds.

3. A fluid coupling comprising an impeller, a runner cooperating with the impeller and providing in conjunction therewith a fluid circuit, and means for by-passing fluid in the circuit through the working faces of the blades of the impeller at a rate decreasing proportionately in inverse relation to the speed of rotation of the impeller.

4. A fluid coupling comprising an impeller including spaced blades having perforations in the working faces thereof for by-passing fluid at a rate inversely proportionate to its speed of rotation, and a runner for cooperation with the impeller.

5. A fluid coupling comprising an impeller having blades each provided with a plurality of small perforations in the working face thereof adjacent the trailing end of the blade for by-passing fluid through the blade at a rate inversely proportionate to the speed of rotation of the impeller, and a runner for cooperation with the impeller.

6. A fluid coupling comprising an impeller having blades each provided with small perforations in its working surface adapted to by-pass a large volume of fluid through the blades at low speeds of rotation of the impeller and a relatively small volume of fluid at high speeds of rotation of the impeller, and a runner for cooperation with the impeller.

7. A fluid coupling comprising an impeller including blades each having perforations in its working surface for by-passing a large volume of fluid at low radial flow of the fluid through the impeller and a small volume of fluid at high radial flow of the fluid through the impeller, and a runner for cooperation with the impeller.

8. A fluid coupling comprising an impeller having blades each provided with perforations in its working face for initially by-passing a large volume of fluid at low speed of rotation of the impeller followed by the by-passing of fluid at a rate decreasing proportionately to increase in speed of the impeller and finally restricting the by-passing of fluid proportionately to the velocity and pressure of the fluid, and a runner associated with the impeller.

RAYMOND J. MILLER.